United States Patent [19]

Fernando

[11] 4,283,208
[45] Aug. 11, 1981

[54] FILTER BAG CLEANING SYSTEM

[75] Inventor: James U. R. Fernando, Wellsville, N.Y.

[73] Assignee: The Air Preheater Company, Inc., Wellsville, N.Y.

[21] Appl. No.: 149,099

[22] Filed: May 12, 1980

[51] Int. Cl.³ ............................................. B01D 46/04
[52] U.S. Cl. ..................................................... 55/304
[58] Field of Search ................. 55/112, 299, 300, 304, 55/305; 210/407, 408

[56] References Cited

U.S. PATENT DOCUMENTS

| | | | |
|---|---|---|---|
| 2,667,233 | 1/1954 | Vedder | 55/304 |
| 3,109,720 | 11/1963 | Cummings et al. | 55/112 |
| 3,212,643 | 10/1965 | Schmidt, Jr. et al. | 55/300 |
| 3,395,519 | 8/1968 | Kleissler | 55/304 |
| 3,487,606 | 1/1970 | Bridges et al. | 55/112 |
| 3,636,680 | 1/1972 | Seidel | 55/304 |
| 3,805,494 | 4/1974 | Kroll | 55/300 |

FOREIGN PATENT DOCUMENTS

| | | | |
|---|---|---|---|
| 534531 | 4/1930 | Fed. Rep. of Germany | 55/112 |
| 916945 | 8/1954 | Fed. Rep. of Germany | 55/112 |
| 2705057 | 10/1978 | Fed. Rep. of Germany | 55/300 |
| 311662 | 10/1971 | U.S.S.R. | 55/112 |

*Primary Examiner*—David L. Lacey
*Attorney, Agent, or Firm*—Wayne H. Lang

[57] ABSTRACT

A cleaning arrangement for a bag filter that shakes the bags horizontally to effect removal of the dust particles that have collected on the surface thereof. A linear force electromagnetic motor is used to impart the horizontal movement to the bags whereby the frequency, amplitude and the duration of movement may be electronically controlled.

3 Claims, 4 Drawing Figures

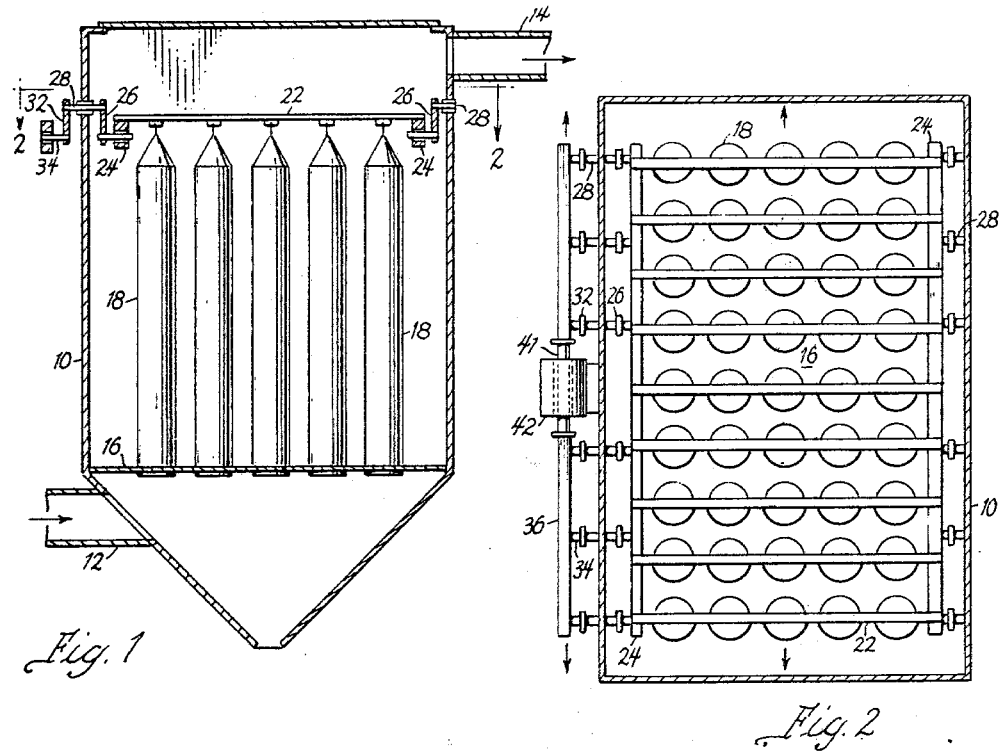
Fig. 1
Fig. 2
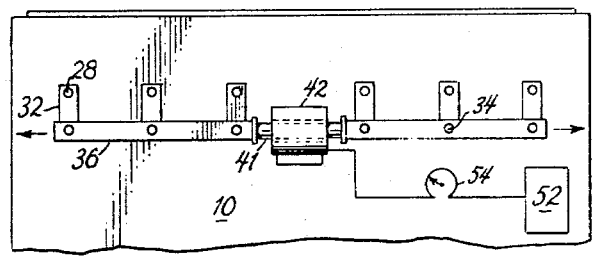
Fig. 3
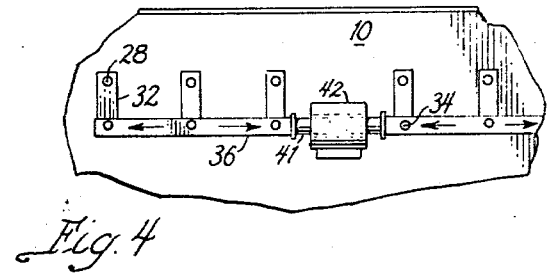
Fig. 4

FILTER BAG CLEANING SYSTEM

BACKGROUND OF THE INVENTION

1. Field of the Invention

The present invention relates to dust collecting devices of the type generally known as bag filters, and more particularly it relates to apparatus that includes specific apparatus adapted to shake each bag to remove particles of dust that have collected upon the surface thereof during the filtering operation.

2. Description of the Prior Art

Various arrangements have been developed for shaking or otherwise vibrating the dust collecting elements whereby dust particles accumulating thereon will become dislodged and fall by gravity to a collecting chamber at the bottom of the housing.

A dilemma frequently associated with known shaking devices is that when sufficient shaking is imparted to the bags to remove dust therefrom, the fabric of the bags quickly deteriorates. This has been found to be especially true with filter bags that are formed from synthetic fabrics such as fiberglass, since repeated stretching or elongation of the bags tends to quickly break the fibers of the filter so as to impart a short life thereto. It has been found, however, that filter bags made from synthetic fibers have superior filtering characteristics for conditions that involve high temperature, excess acid or abrasive dust, so the goal of finding suitable shaking means for a bag filter still remains. In a continuing effort to provide apparatus that imparts a suitable motion to the filter bags of a bag filter, vibrators, oscillators and rockers have been constructed after examples set forth by various patents.

In U.S. Pat. Nos. 2,932,362 and 3,955,947 arrangements have been developed whereby a rotary motor is attached to a series of filter bags by means of an eccentric linkage to impart an oscillatory movement to the several bags to produce a shaking and stretching action that removes the collected dust therefrom. While it is recognized that an oscillatory movement may be used to shake dust from the surface of a filter, the agitation promoted by such a movement may not be satisfactory for the removal of dust under all conditions since it simultaneously produces a stretching action that causes deterioration and failure of the filter bags.

Electric vibrators have also been used, however, the amplitude of movement to the bags imparted by such apparatus is insufficient in most cases to jar the more tenacious particles therefrom.

SUMMARY OF THE INVENTION

This invention therefore has as its chief objective the provision of a shaking device for removing accumulated particles from filtering elements of a bag-type filter. The invention discloses a specific arrangement whereby filter bags of a bag-type filter may be imparted ample amounts of rapid horizontal reciprocatory movement to effectively dislodge collected dust particles therefrom. Furthermore, the movement thereof is limited to a pure horizontal motion that does not stretch, break or otherwise damage the fibers of the bag filter. The horizontal shaking is electronically regulated from a remote position to impart variable amplitude and frequency of shaking for maximum cleaning action without effecting destruction of the fibers that constitute the filter bags.

BRIEF DESCRIPTION OF THE DRAWING

FIG. 1 shows a side elevation of a bag filter having a cleaning arrangement constructed in accordance with the present invention, FIG. 2 shows a top view of a preferred arrangement, FIG. 3 shows a side elevation view including the linear force motor, and FIG. 4 shows an alternate arrangement that utilizes a linear force motor with balanced actuation.

DESCRIPTION OF THE PREFERRED EMBODIMENT

The unit shown in the drawing includes a housing 10 having an inlet 12 for dirty gas and an outlet 14 for the exhaust of clean gas therefrom. An apertured tube sheet 16 is provided intermediate inlet 12 and outlet 14 to divide the housing into inlet and outlet chambers, while porous filter bags 18 are secured to the tube sheet around each aperture thereof to provide a filter through which gas must flow when passing from the inlet to the outlet ducts.

The upper ends of the filter bags 18 are supported from a series of cross rods 22 whose ends are supported by the support rails 24 at the sides of the housing. The support rails 24 are supported at opposite sides of housing 10 by a series of crank shaped hangers 26 that are pivoted in bearings 28 located in opposite walls of the housing. Although similar support hangers 26 depend from bearings 28 at opposite sides of the housing, the cranks at one side of the housing also include an actuating arm 32 which is essentially parallel to and co-extensive with hanger 26. The end of arm 32 opposite bearing 28 is pivotally connected at 34 to a horizontal slider or connecting rod 36 that is axially movable according to movement of the armature 41 of linear motor 42.

Motor 42 comprises an electromagnetic linear force motor of conventional design that is positioned between ends of the rod 36. Although the linear force motor is deemed conventional, it may be adapted to provide simple horizontal movement to armature 41 as shown in FIG. 3, or it may be divided to provide equal movement in opposite directions. In FIG. 4 the divided connecting rod 36 abuts ends of a divided armature 41 to balance the loading force on the baghouse imparted by the reciprocatory movement.

Movement of the armature 41 is accomplished by applying current from a convenient source of supply 52 to electric coils that surround armature in motor 42. A control device 54 may vary the current being supplied to the motor whereby the frequency, the amplitude and the duration of movement may be readily controlled.

I claim:

1. Filtration apparatus for removing entrained dust particles from a gas stream comprising a housing having an inlet port for dust entrained gas and an outlet port for the exhaust of clean gas therefrom, an apertured tube sheet intermediate the inlet and outlet ports arranged to divide the housing into inlet and outlet sections, a plurality of porous filter bags each having an open end and a closed end with the open end thereof attached to the tube sheet around each aperture thereof to permit the flow of clean gas therethrough while retaining dust particles on the surface of the filter, cleaning means for said filter bags comprising a linear force electromagnetic motor having oppositely extending slider rods connected to said filter bags so as to move horizontally to shake each filter bag, a source of electric current connected to the linear force motor, and means for controlling the current being supplied to the linear force motor to modulate the frequency and amplitude of movement of the slider rods to vary the cleaning effect of said cleaning means.

2. Filtration apparatus for removing entrained dust particles as defined in claim 1 wherein the means for controlling the current comprises electronic control means.

3. Filtration apparatus for removing entrained dust particles from a gas stream as defined in claim 2 wherein the slider rods are constructed and arranged to move simultaneously in opposite directions to balance the loading force of said apparatus.

* * * * *